Jan. 24, 1933.   P. W. ELMORE   1,895,030
RAIL JOINT CLAMP
Filed May 11, 1929
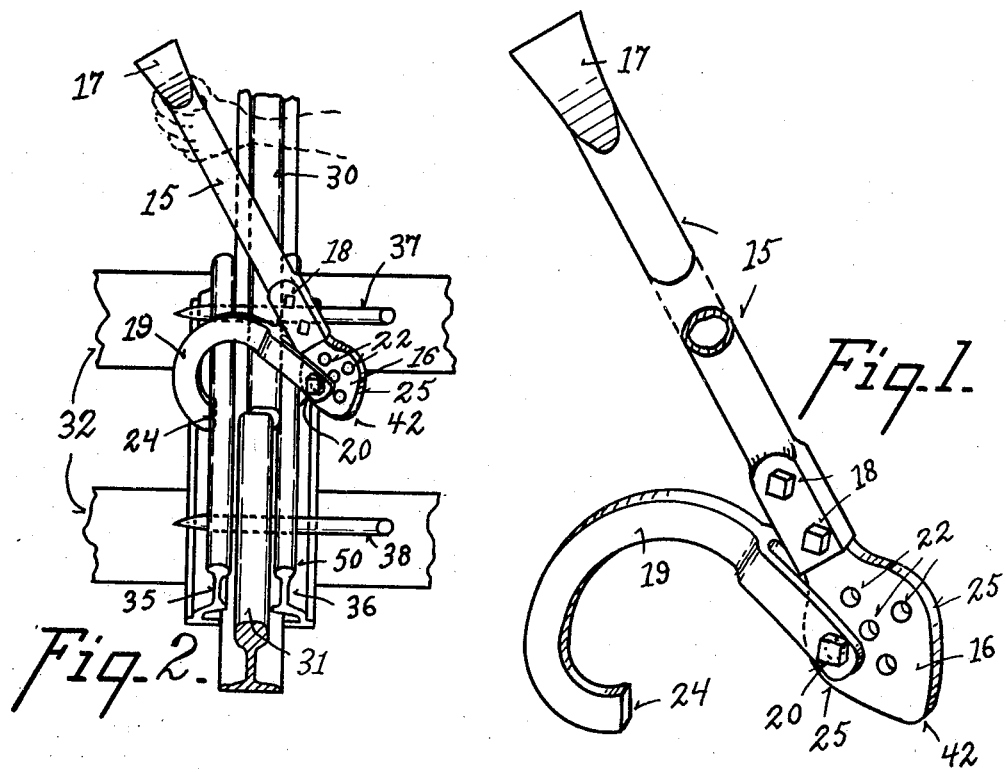
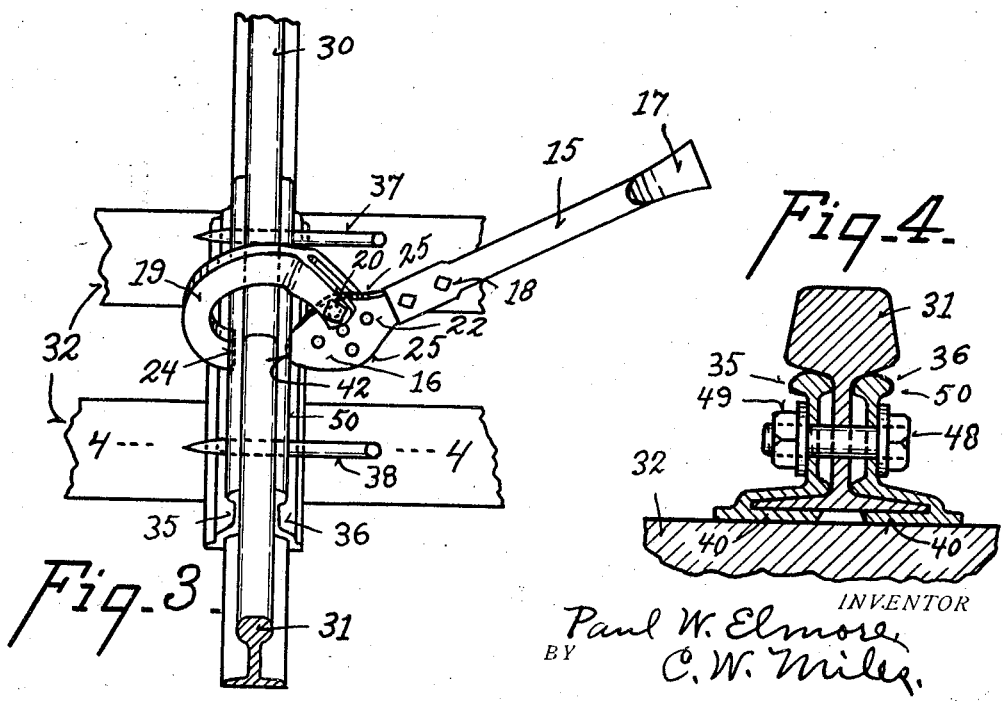
INVENTOR
Paul W. Elmore,
BY C. W. Miles,
ATTORNEY Patented Jan. 24, 1933

1,895,030

UNITED STATES PATENT OFFICE

PAUL W. ELMORE, OF CINCINNATI, OHIO, ASSIGNOR TO THE AMERICAN VALVE AND METER COMPANY, OF CINCINNATI, OHIO, A CORPORATION OF OHIO

RAIL JOINT CLAMP

Application filed May 11, 1929. Serial No. 362,391.

My invention relates to an improved rail-joint clamp. One of its objects is to provide an improved tool by means of which a single operator is enabled to apply the rail clamps and complete a rail-joint, where it has heretofore required the united services of two or more persons. Another object is to provide a tool adjustable so as to be applicable to advantage when applied to either light or heavy rails. Another object is to provide a combination tool for use in clamping rail joints, which comprises in one tool all the implements required for the purpose thereby insuring that a portion of the tools required shall not be found wanting when the work location is reached. My invention also comprises certain details of form and arrangement, and combination of components, all of which will be fully set forth in the description of the accompanying drawing, in which:—

Fig. 1 is a perspective view of my improved tool, or implement.

Fig. 2 is a detail of the members of a rail joint loosely assembled preparatory to clamping the ends of two rails together, and illustrating a preliminary position of my improved tool preparatory to aligning the ends of the rails and applying the rail clamps thereto.

Fig. 3 is a view similar to Fig. 2, illustrating the position of the respective members and tool after the ends of the rails have been aligned and the rail joint members forced into intimate relation with the rail ends and held in that position ready to receive the clamping bolts and nuts.

Fig. 4 is a sectional detail through the completed rail joint, taken on line 4—4 of Fig. 3.

The accompanying drawing illustrates one embodiment of my invention in which 15 represents a handle-bar or lever provided at one end with a cam-shaped head 16, and preferably at the opposite end with a relatively thin and sharp blade 17 adapted to be used as a crowbar or pinchbar when required. I have illustrated the handlebar 15 constructed from tubular stock with the shank of the cam-shaped head 16 telescoped into one end of the handlebar and attached thereto by rivets or bolts 18 in order to provide a tool of relatively light weight. If desired the handlebar and its cam-shaped head may be constructed by forging or casting in one piece of metal.

A loop-shaped clamping yoke or hook 19 is forked at one end and is pivotally attached at said forked end to the cam-shaped head 16 by means of a bolt or pin 20, which passes through a perforation in each of said forked ends and through one of the perforations 22 in the head 16. A nut is preferably attached to the threaded end of the bolt 20, to hold the bolt in place. The head 16 is provided with a series of perforations 22 in order that the bolt 20 may be selectively inserted through any one of said perforations 22, to thereby pivotally attach the forked end of the yoke 19 concentrically with any desired one of the perforations 22 to thereby increase or decrease the space between the free end or shoe 24 of the yoke 19 and the cam face 25 of head 16, and thereby adapt the tool to use with light or heavy rails, or for different service. The head 16 is preferably provided with substantially duplicate shaped cam faces 25 upon opposite edges thereof to provide a tool adapted for use upon either cam face, and to provide for increased wearing surface and longer life of the tool.

In practice the long heavy rails 30 and 31, some of them thirty to eighty feet in length and weighing up to one hundred pounds or more per yard in length, are dropped end to end in approximately the position the rails are to occupy, upon previously laid cross-ties 32, by means of mechanical cranes. The cranes are not able to lay the rails in accurate alignment, or to lay the rails with the ends of the rails accurately spaced apart. This alignment of the rails, spacing the ends of the rails apart and adjusting the rail joint members into position relative to the meeting ends of the rails with the first pair of bolts and nuts in place is a manual operation, which has heretofore required the joint services of from two to four men with crowbars and other tools, while another group of men followed to insert the balance of the bolts and tighten up all of the nuts.

Employing my improved tool as illustrated in Figs. 2, 3, and 4, one operator is enabled to assemble a pair of rail joint members 35 and 36 upon opposite sides of the meeting ends of an unaligned rail joint as illustrated in Fig. 2 with metal pins 37 and 38 inserted through one set of bolt holes in the respective rail joint members and through a corresponding hole through the web of each rail. The shoe 24 of the yoke 19 is then applied against the outer face of one rail joint member 35, and the cam face 25 of the head 16 against the outer face of the opposite rail joint member 36, in substantially the position shown in Fig. 2, and power applied to the free end of the handlebar 15, which enables a single operator to exert sufficient force and leverage against the outer faces of the respective rail joint members 35 and 36 to force the rail joint members into intimate relation with the webs and bases of the rails, so as to cause the ends of the rails to align one with the other, and also by reason of the pins 37 and 38 to cause the holes in the webs of the rails to come into alignment and register with the bolt holes in the respective rail joint members 35 and 36. In effecting the above result the cam face 25 has a rolling and changing point of engagement with the rail joint member 36, so that the handlebar 15, head 16 and yoke 19 move to and assume approximately the position shown in Fig. 3, in which position the tool serves to lock and hold the rail joint members and rail ends locked in aligned position with very little if any effort or attention on the part of the operator, who is thus practically free to use his hands to insert a bolt 48 in position to hold the rail joint members in engagement with one rail end and to apply a nut 49 thereto, and to then apply a similar bolt and nut to hold the rail joint members in position with reference to the other rail end, after which the operator is free to detach his clamping tool and proceed to the next rail joint for another operation, relying upon operators to follow to insert the balance of the clamping bolts and tighten the nuts thereon. Wherever required the blade 17 and handlebar 15 may be employed as a crowbar, to insert the lower webs 40 of the rail clamps beneath the bases of the rails, and between the bases of the rails and the ties, or for any similar operation. The yoke 19 may be pivotally mounted with reference to any one of the perforations 22 in the head 16 to secure the desired opening between the shoe 24 and the head 16, or to secure a maximum leverage upon the members to be clamped together. It will be noted that in the position Fig. 2 the side of the cam 25 is engaged with the rail joint member 36, while in the position Fig. 3, the extreme end or nose 42 of the head 16 is in engagement with the rail joint member 36, in the longitudinal channel below the upper longitudinal rib 50 of the rail joint member 36. It will also be noted that in and about the position shown in Fig. 3, a maximum leverage or clamping effect is exerted upon the members to be clamped together.

The apparatus herein shown and described is capable of considerable modification within the scope of the claim without departing from the spirit of my invention.

What I claim is:—

A tool for aligning adjacent ends of a pair of rails between rail joint members, comprising a hook shaped yoke having a bifurcated or forked end and having its other end inturned toward the forked end, the inturned end having a shoe or free end for contact upon a rail joint member disposed on one side of a pair of end to end abutting rails, a flat head of substantially oval or pear shape and having a nose formed at its one end, the head having a pin receiving aperture offset from its longitudinal center line and at the approximate shoulder or widest part thereof, the arms at the bifurcated end of the yoke receiving the head flatwise between them, a pin carried between said arms and extending through the pin receiving aperture in the head, whereby the nose end of the head may be moved to a position between the pin and the shoe on the yoke and to a position in substantial alignment with the arms and projecting away from the shoe and arms, and an actuating handle secured on the head at the end thereof remote from the nose and beyond the aperture in the head, whereby to apply leverage force by contact of the nose upon a second rail joint member disposed opposite to the first mentioned rail joint member, for aligning abutting rails disposed between the rail joint members, the nose assuming a position in substantial opposition to the shoe and in substantial alignment with the shoe and pin when the rail ends have been brought into registry and alignment.

In testimony whereof I have affixed my signature.

PAUL W. ELMORE.